United States Patent [19]
Klicker et al.

[11] 3,928,505
[45] Dec. 23, 1975

[54] DIPENTAERYTHRITOL AND PENTAERYTHRITOL PHOSPHITE

[75] Inventors: James D. Klicker, Morgantown, W. Va.; Murray S. Cohen, Convent Station, N.J.

[73] Assignee: Borg-Warner Corporation, Chicago, Ill.

[22] Filed: Oct. 16, 1974

[21] Appl. No.: 515,254

[52] U.S. Cl. ..... 260/921; 260/2.5 AJ; 260/2.5 AM; 260/77.5 AR; 260/927 R; 260/968; 260/982
[51] Int. Cl.$^2$........................................... C07F 9/15
[58] Field of Search............................ 260/921, 982

[56] References Cited
UNITED STATES PATENTS

| | | | |
|---|---|---|---|
| 3,310,609 | 3/1967 | Baranauckas et al........... | 260/982 X |
| 3,422,453 | 1/1969 | Frank............................... | 260/982 X |
| 3,819,771 | 6/1974 | Batorewicz......................... | 260/921 |

*Primary Examiner*—Richard L. Raymond
*Attorney, Agent, or Firm*—Cushman, Darby & Cushman

[57] ABSTRACT

By reacting a mxiture of pentaerythritol and dipentaerythritol with a trihydrocarbyl or trihalohydrocarbyl phosphite, preferably triphenyl phosphite there is obtained pentaerythritol-dipentaerythritol phosphite as a relatively low melting solid. In contrast to the use of only pentaerythritol or dipentaerythritol the product can be readily worked as a liquid above 110°C., e.g., 150°-160°C. Furthermore, the performance and physical properties of this product are not the same as that of an equal molar mixture of pure pentaerythritol phosphite and dipentaerythritol phosphite.

8 Claims, No Drawings

DIPENTAERYTHRITOL AND PENTAERYTHRITOL PHOSPHITE

The present invention relates to the preparation of pentaerythritol-dipentaerythritol phosphite.

It is known to prepare either tri (mono-pentaerythritol) tetra phosphite or dipentaerythritol diphosphite as a high melting solid, e.g., see Baranauckas U.S. Pat. No. 3,310,609, Examples 1 – 3. The entire disclosure of Baranauckas is hereby incorporated by reference and relied upon. Such products are useful as flame and fire retardants, e.g., for polyurethanes and hydrocarbon polymers and as heat and light stabilizers, e.g., for vinyl and vinylidene halide polymers, e.g., polyvinyl chloride and as process stabilizers for polycarbonates, aromatic polyesters and polyphenylene oxides.

A commercial product made by reacting relatively pure mono-pentaerythritol (98%) with triphenyl phosphite is known as TP-24. It is a high melting solid. Even as a crude reaction mixture it does not start melting until 190° – 195°C. Thus, to remove the last 15 – 20% of the phenol, pot temperatures of 225°C. or higher are required and the product must be cast at temperatures of about 210°C. The high pot temperatures required have caused product decomposition when hot spots developed on the walls of the reactor. Also, pouring the product at a temperature of 210°C. requires special equipment and handling in the plant. Also, the maintenance of phosphite esters at temperatures >200°C. is a dangerous operation due to spontaneous, exothermic reactions which are known to occur at these elevated temperatures.

It has now been found that a lower melting product can be obtained having the same uses as the product of Baranauckas, including TP-24, if instead of utilizing relatively pure pentaerythritol there is employed pentaerythritol containing substantial amounts of dipentaerythritol in reacting with triphenyl phosphite or other tertiary phosphite of the formula

where $R_1$, $R_2$ and $R_3$ are hydrocarbyl, e.g., alkyl, cycloalkyl, aralkyl or aryl, or halohydrocarbyl, e.g., haloalkyl, haloaralkyl or haloaryl. For example, there can be reacted technical grade mono pentaerythritol (containing 88% mono pentaerythritol and 12% dipentaerythritol) with triphenyl phosphite. The exact nature of the pentaerythritoldipentaerythritol phosphite obtained is not known. However, it is not the same as a simple mixture of preformed pentaerythritol phosphite and dipentaerythritol phosphite. Thus, a mixed melting point run using 88% TP-24 (tri (monopentaerythritol) tetraphosphite) and 12% dipentaerythritol diphosphite did not give the low melting point observed with the product of the present invention prepared by simultaneously reacting monopentaerythritol and dipentaerythritol with the tertiary phosphite.

The amount of mono-pentaerythritol in the mixture of mono-pentaerythritol and dipentaerythritol can vary from 70 % to 94 %, e.g., 80 to 94%, preferably 86 to 90%.

The amount of mono-pentaerythritol and dipentaerythritol employed is desirably sufficient to provide the stoichiometric amount of at least 3 moles of mono-pentaerythritol for 4 moles of phosphite plus 1 mole of dipentaerythritol for each two moles of phosphite, e.g., 0.88 mole of mono-pentaerythritol and 0.12 mole of dipentaerythritol is stoichiometrically equivalent to 1.17 moles + 0.24 moles or a total of 1.41 moles of phosphite. Preferably a slight excess, e.g., 5 to 10% of the mixture of mono-pentaerythritol and dipentaerythritol over the stoichiometric amount is employed.

While it is preferred to used triphenyl phosphite there can be used other tertiary phosphites, e.g., trimethyl phosphite, triethyl phosphite, triisopropyl phosphite, tributyl phosphite, triamyl phosphite, trihexyl phosphite, tris cyclohexyl phosphite, tri 2-ethylhexyl phosphite, tris isooctyl phosphite, tris decyl phosphite, tris lauryl phosphite, tribenzyl phosphite, tri p-tolyl phosphite, tri o-tolyl phosphite, tri m-tolyl phosphite, tris (2-chloroethyl) phosphite, tris (2-chloropropyl) phosphite, tris 3-chloropropyl phosphite, tri o-chlorophenyl phosphite, tri p-chlorophenyl phosphite, diphenyl decyl phosphite, didecyl phenyl phosphite, tris (2-bromopropyl) phosphite, diethyl methyl phosphite.

The reaction can be carried out with conventional catalysts, e.g., alkaline catalysts or dihydrocarbyl phosphites or the catalyst can be omitted. It is preferred to use a catalyst. Thus, there can be used 0.03 to 1.5% of catalyst based on the weight of the phosphorus compound. Thus, there can be employed alkali metal and alkaline earth metal alcoholates and phenates, e.g., sodium methylate, potassium methylate, lithium methylate, sodium ethylate, potassium ethylate, sodium isopropylate, sodium decylate, sodium phenolate, potassium phenolate, sodium cresylate, calcium ethylate, sodium hydride, sodium metal, potassium metal, etc. There can also be used sodium hydroxide, potassium hydroxide and quaternary ammonium hydroxides, e.g., trimethyl benzyl ammonium hydroxide and susbstituted guanidines, e.g., pentamethyl guanidine. As secondary phosphite catalysts there can be used, for example, diphenyl phosphite, dimethyl phosphite, diethyl phosphite, didecyl phosphite, di (2-chlorophenyl) phosphite, dicyclohexyl phosphite, and di p-tolylphosphite.

The phenol or alcohol formed in the reaction is removed in conventional fashion by vacuum distillation. Terminal conditions are preferably 200°C. at 5mm. The vacuum is preferably broken with an inert, dry gas, e.g., nitrogen, argon or helium and the cast product is preferably cooled under such an inert, dry gas, e.g., nitrogen, to prevent hydrolysis.

Casting of the product of the present invention takes place quite readily at 150° to 160°C.

Unless otherwise indicated all parts and percentages are by weight.

EXAMPLE 1

There were employed 1192 pounds of triphenyl phosphite, 421 pounds (5% excess) of technical grade pentaerythritol (a commercial product containing 88% mono pentaerythritol and 12% dipentaerythritol, this amounts to 2.72 moles of mono pentaerythritol and 0.20 moles of dipentaerythritol), 410 pounds of phenol and 2 pounds of sodium methylate.

The procedure was as follows: The technical grade pentaerythritol and phenol were charged to the reaction vessel. There were distilled off about 5 gallons of phenol at a pressure of 50 – 60 mm. Then there were charged 725 pounds of triphenyl phosphite and 2 pounds of sodium methylate. The mixture was heated to 150°C. and held for 0.5 hour. The pressure was reduced and 50 gallons of phenol stripped off. Then 467 pounds of triphenyl phosphite were charged. The mixture was held at 150°C. for 1 hour and then heated to 160°C. and the pressure slowly reduced to strip off phenol with terminal conditions of 200°C. and 5 mm. The product was then cooled to 160°C. and cast into trays. The yield of product was 474 pounds (about 40 gallons). The distillate removed was 154 pounds (about 40 gallons). The trays were protected from atmosphere moisture by covering with plastic, e.g., vinylidene-chloride-vinyl chloride copolymer (SARAN), or polyethylene and under a nitrogen atmosphere. The product was subsequently ground, placed in double plastic, e.g., polyethylene, bags and packed in fiber drums.

The product of this example started to melt at 55° – 65°C. and was fluid enough to pour and cast at 160°C. The product contained 0.2% phenoxy an acid number (AN) mg KOH/g of 0.2 and analyzed C 35.8%, H 5.0%, P 22.9%. The yield was estimated as 75–80%.

EXAMPLE 2

The following runs were carried out on a laboratory scale. In each case the catalyst was 0.2% sodium methylate based on the triphenyl phosphite. In run 1 no excess pentaerythritol was used but in all of the other runs there was used 5% excess of the mono pentaerythritol-dipentaerythritol mixture over that theoretically required to react with the phosphite. In runs 2, 3 and 4 there was used a mixture of 88% of monopentaerythritol and 12% dipentaerythritol and in run 5 there was used a mixture of 50% pure mono pentaerythritol and 50% technical grade pentaerythritol. (Thus run 5 contained about 94% monopentaerythritol and about 6% dipentaerythritol.) In run 6 a mixture of 20% pure monopentaerythritol and 80% technical grade pentaerythritol was used. (Thus, run 6 contained about 90% monopentaerythritol and 10% dipentaerythritol).

lene-butadiene copolymer (butyl rubber, e.g. 97:3, 98.5:1.5 isobutylene-butadiene). They can also be used to stabilize ABS rubbers and resins (acrylonitrile-butadiene-styrene terpolymers, e.g., 50:40:10).

Furthermore, they can be used as fire retardants and stabilizers for polyurethanes in an amount of 0.01 to 20%, e.g. with the polyurethane from toluene diisocyanate and polypropylene glycol molecular weight 2028.

Furthermore, they can be used as stabilizers any synergists in thermoplastics, e.g., polycarbonates, polyolefins and polyesters. They can also be used in polyphenylene oxide polymers.

Furthermore, they can be used as heat and light stabiliziers for halogen containing polymers, e.g. in an amount of 0.01 to 20% of the polymer. Examples of halogenated polymers which can be stabilized include chlorinated polyethylene having about 14 to about 75%, e.g., 76% chlorine, polyvinyl chloride, polyvinylidene chloride, polyvinyl bromide, polyvinyl fluoride, polyvinylidene fluoride, polytetrafluoroethylene, copolymers of vinylidene chloride and acrylonitrile (e.g., 80:20) or vinyl chloride (e.g., 85:15), copolymers of vinyl chloride with to 1 to 90%, preferably 1 to 40%, by weight of copolymerizable materials such as vinyl acetate, vinylidene chloride, vinylidene fluoride, acrylonitrile, diethyl fumarate, diethyl maleate and other alkyl maleates and fumarates, vinyl propionate, methyl acrylate, ethyl acrylate, butyl acrylate, 2-ethylhexyl acrylate and other alkyl acrylates, methyl methacrylate, butyl methacrylate and other methacrylates, methyl alpha chloroacrylate, styrene, vinyl ethyl ether, vinyl methyl ketone, allylidene diacetate and trichloroethylene. Typical copolymers include vinyl chloride-vinyl acetate (96:4), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), vinyl chloride-acrylonitrile (60:40), vinyl chloride-2-ethylhexyl acrylate (80:20).

There can also be stabilized acrylonitrile-vinyl chloride copolymer (85:15), halogenated rubbers such as polychloroprene, chlorinated polyisobutylene, chlori-

| Run | 1 | 2 | 3 | 4 | 5 | 6 |
|---|---|---|---|---|---|---|
| MP°C | 83–112 | 59–73 | 67–78 | 54–78 | 44–52 | 55–64 |
| Yield % | 102 | 97.5 | 90.0 | 89.5 | 106 | 97 |
| Phenoxy % | 2.7 | 0.2 | 0.1 | 0.1 | 1.6 | 0.2 |
| AN mg KOH/g | 1.9 | 0.5 | 0.4 | 0.2 | 0.5 | 0.5 |
| C | 40.5 | 35.1 | | | | |
| H | 5.0 | 5.0 | | | | |
| P | 18.4 | 22.3 | | | | |

In run 5 the product solidified at 102°C. and remelted at 158°–194°C. In run 6 the product solidified at 105°C and remelted at 175°–198°C.

The products of the invention are useful as fire retardants and stabilizers, e.g., against atmospheric deterioration for hydrocarbon polymers. Thus, they can be used in an amount of 0.01 to 20% of the polymer, e.g., with monoolefin polymers such as polyethylene, polypropylene, ethylene-propylene copolymers (e.g., 80:20, 50:50, or 20:80), ethylene-propylene-non-congugated polyene terpolymers, e.g., ethylene-propylene-cyclooctadiene terpolymer, ethylene-butene-1 copolymer, ethylene-decene-1 copolymer, polystyrene, polyolefin polymers, e.g., diolefin polymers such as natural rubber, polybutadiene, cis-isoprene polymer, rubbery butadiene-styrene copolymer, polyisobutyl, isobutynated natural rubber, brominated butyl rubber, chlorinated butyl rubber.

There can be added to the halogenated polymer compositions conventional synergestic stabilizers such as barium, cadmium and zinc salts, e.g., 0.5 to 10% of mixed barium-cadmium laurates, barium laurate, cadmium octoate, zinc stearate, etc.

To both the hydrocarbon polymer compositions and the halogenated polymer composition there can be added 0.1 to 10% based on the polymer of conventional phenolic antioxidants, e.g., 2,2-methylene bis (4-methyl-6-t-butylphenol), 2,4,6-tri-t-butylphenol, 4, 4'-isopropylidene bis phenol, etc.

EXAMPLE 3

The use of the product of the present invention as a flame retardant with polypropylene is shown below. There was employed the mono pentaerythritol-dipentaerythritol phosphite prepared in Example 1.

| Component | Formulation | | | | |
|---|---|---|---|---|---|
| | 1 | 2 | 3 | 4 | 5 |
| Polypropylene | 93.2% | 93.2% | 90.0% | 90.0% | 90.0% |
| Citex-BC-26 | 5.0 | 5.0 | 6.0 | 6.5 | 7.0 |
| Antimony Oxide | 1.8 | 0.9 | — | — | — |
| Compound of Example 1 | — | 0.9 | 4.0 | 3.5 | 3.0 |
| Oxygen Index | 25.5 | 25.5 | 23.8 | 23.8 | 23.8 |
| UL-94 Rating | V-2 | V-2 | V-2 | V-2 | V-2 |

Citex BC-26 is an alicyclic halocarbon fire retardant (made by Cities Service Company).

The amount of mono pentaerythritol and dipentaerythritol should satisfy the equations

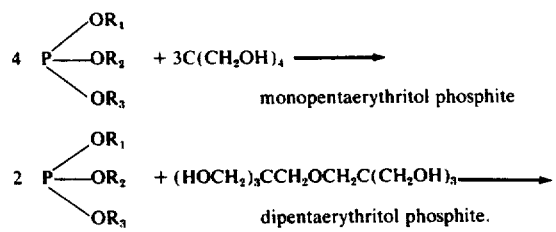

What is claimed is:

1. Mixed mono-pentaerythritol-dipentaerythritol phosphite prepared by reacting 70 to 94 molar percent of mono pentaerythritol and 30 to 6 molar percent of dipentaerythritol with a phosphite of the formula:

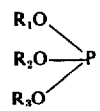

where each of $R_1$, $R_2$ and $R_3$ is an alkyl of 1 to 12 carbon atoms, benzyl, cyclohexyl, phenyl, tolyl, haloalkyl of 2 to 3 carbon atoms or halophenyl wherein the total phosphite employed is sufficient to provide mono pentaerythritol to dipentaerythritol to phosphite in the relative proportion of from 3 moles of mono pentaerythritol to 3 moles plus 10% in excess thereof for 4 moles of phosphite and from 1 mole of dipentaerythritol to 1 mole plus 10% in excess thereof for 2 moles of phosphite, and removing the $R_1OH$, $R_2OH$ and $R_3OH$ formed, said mono pentaerythritol-dipentaerythritol phosphite being pourable at 160°C.

2. The phosphite prepared according to claim 1 wherein the mono pentaerythritol is 80 to 94% of the total of mono pentaerythritol and dipentaerythritol.

3. The phosphite prepared according to claim 2 wherein the mono pentaerythritol and dipentaerythritol are used in an excess of 5 to 10% over that required to react with all the

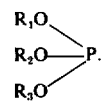

4. The phosphite prepared according to claim 3 wherein the monopentaerythritol is 86 to 88% of the total of mono pentaerythritol and dipentaerythritol and $R_1$, $R_2$ and $R_3$ are all phenyl.

5. The phosphite prepared according to claim 1 wherein each of $R_1$, $R_2$ and $R_3$ is an alkyl of 1 to 12 carbon atoms, benzyl, cyclohexyl, phenyl, tolyl, chloroalkyl of 2 to 3 carbon atoms or chlorophenyl.

6. The phosphite prepared according to claim 1 wherein $R_1$, $R_2$ and $R_3$ are phenyl.

7. The phosphite of claim 1, wherein the mono pentaerythritol is 86 to 90% of the total of mono pentaerythritol and dipentaerythritol.

8. The phosphite of claim 1 characterized by being solid at room temperature and liquid at 150°C.

* * * * *